US012272331B2

(12) United States Patent
Cho et al.

(10) Patent No.: US 12,272,331 B2
(45) Date of Patent: Apr. 8, 2025

(54) DISPLAY APPARATUS AND CONTROL METHOD THEREOF

(71) Applicant: LX SEMICON CO., LTD., Daejeon (KR)

(72) Inventors: Jae Chan Cho, Daejeon (KR); Jun Young Park, Daejeon (KR); Seul Gi Lee, Daejeon (KR); Ji Won Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/536,970

(22) Filed: Dec. 12, 2023

(65) Prior Publication Data

US 2024/0194160 A1 Jun. 13, 2024

(30) Foreign Application Priority Data

Dec. 13, 2022 (KR) ........................ 10-2022-0173351
Nov. 10, 2023 (KR) ........................ 10-2023-0155386

(51) Int. Cl.
*G09G 3/36* (2006.01)

(52) U.S. Cl.
CPC ......... *G09G 3/3648* (2013.01); *G09G 3/3607* (2013.01); *G09G 2320/0257* (2013.01); *G09G 2320/0295* (2013.01); *G09G 2320/046* (2013.01)

(58) Field of Classification Search
CPC ............... G09G 3/3648; G09G 3/3607; G09G 2320/0257; G09G 2320/0295; G09G 2320/046
See application file for complete search history.

(56) References Cited

U.S. PATENT DOCUMENTS

| | | | | |
|---|---|---|---|---|
| 11,670,212 | B2 * | 6/2023 | Lee .......................... | G09G 3/32 345/690 |
| 2019/0295510 | A1 * | 9/2019 | Mobasher .............. | G09G 5/393 |
| 2022/0223092 | A1 | 7/2022 | Lee et al. | |
| 2022/0223104 | A1 | 7/2022 | Sun et al. | |

OTHER PUBLICATIONS

Extended European Search Report dated Apr. 18, 2024, issued for the corresponding European patent application No. 23215951.7, 11 pages.

* cited by examiner

*Primary Examiner* — Peter D McLoone
(74) *Attorney, Agent, or Firm* — ROTHWELL, FIGG, ERNST & MANBECK, P.C.

(57) ABSTRACT

The present disclosure relates to a display apparatus and control method thereof. The display apparatus includes a receiver configured to receive input image data, an accumulator configured to generate a cumulative data count by analyzing a degree of degradation according to the received input image data and a burn-in factor, an interpolator configured to update the cumulative data count in a memory by applying an adaptive weight to the generated cumulative data count, and a compensator configured to generate compensation data using the input image data and the updated cumulative data count.

18 Claims, 7 Drawing Sheets

【FIG.1】
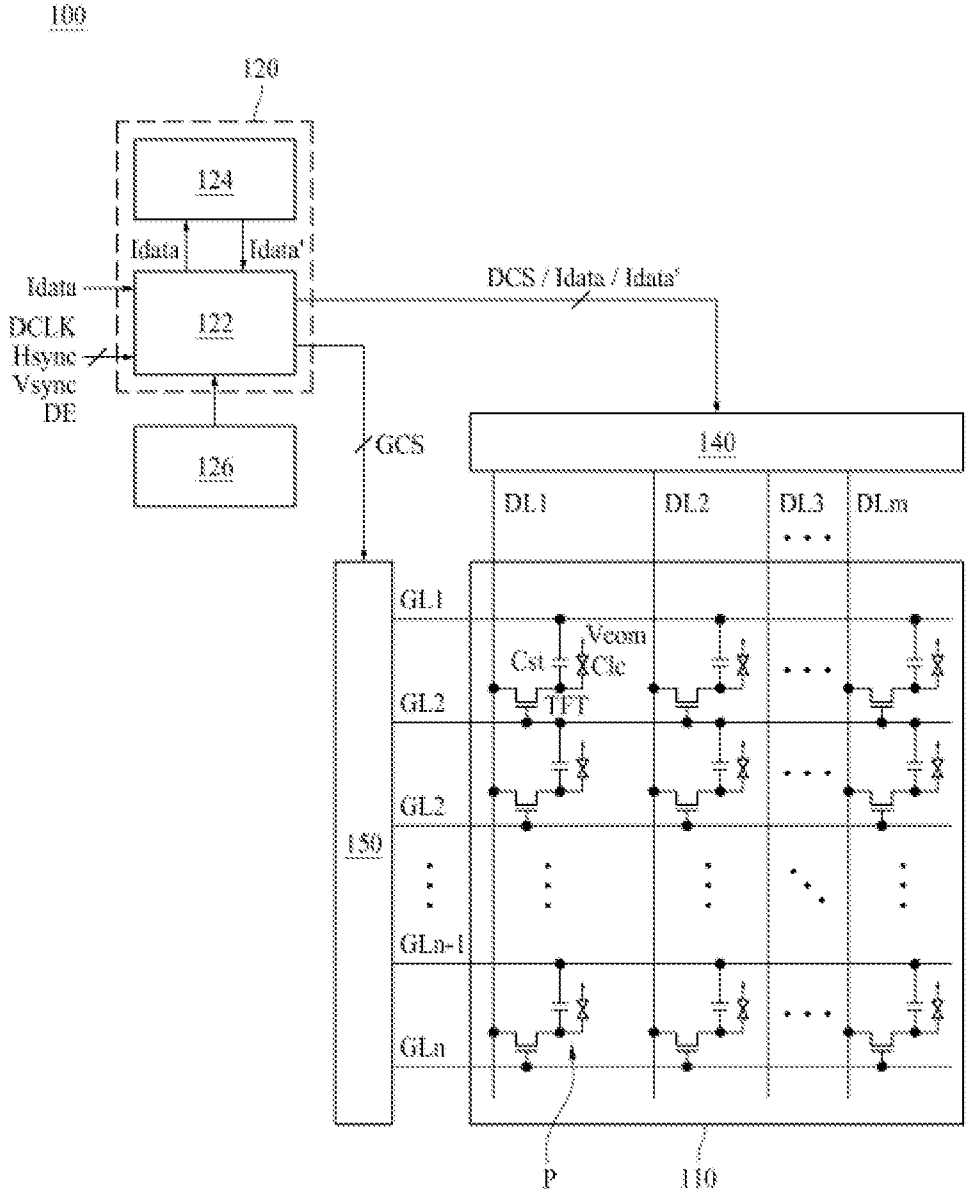

【FIG. 2】
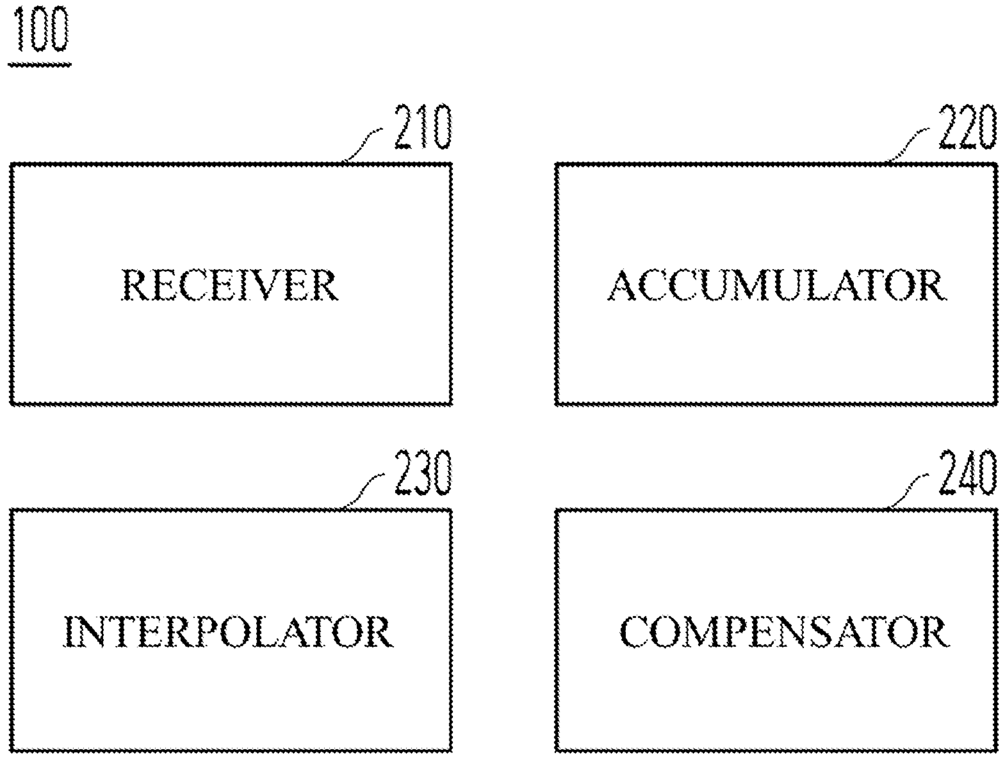

【FIG. 3】
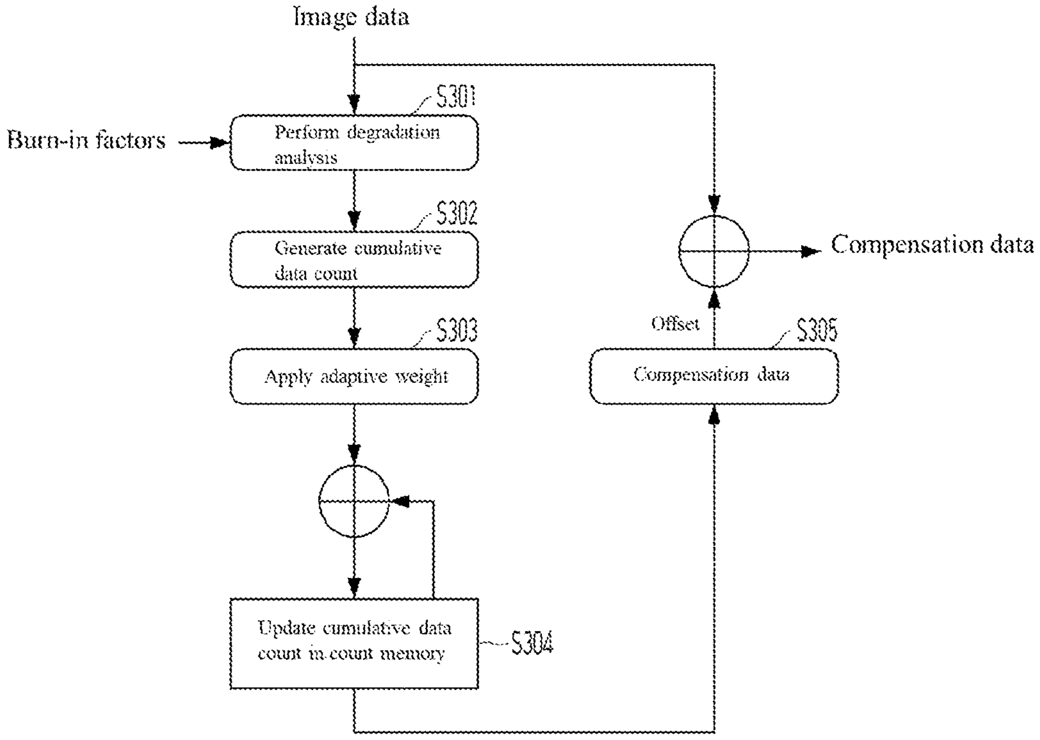

【FIG. 4】
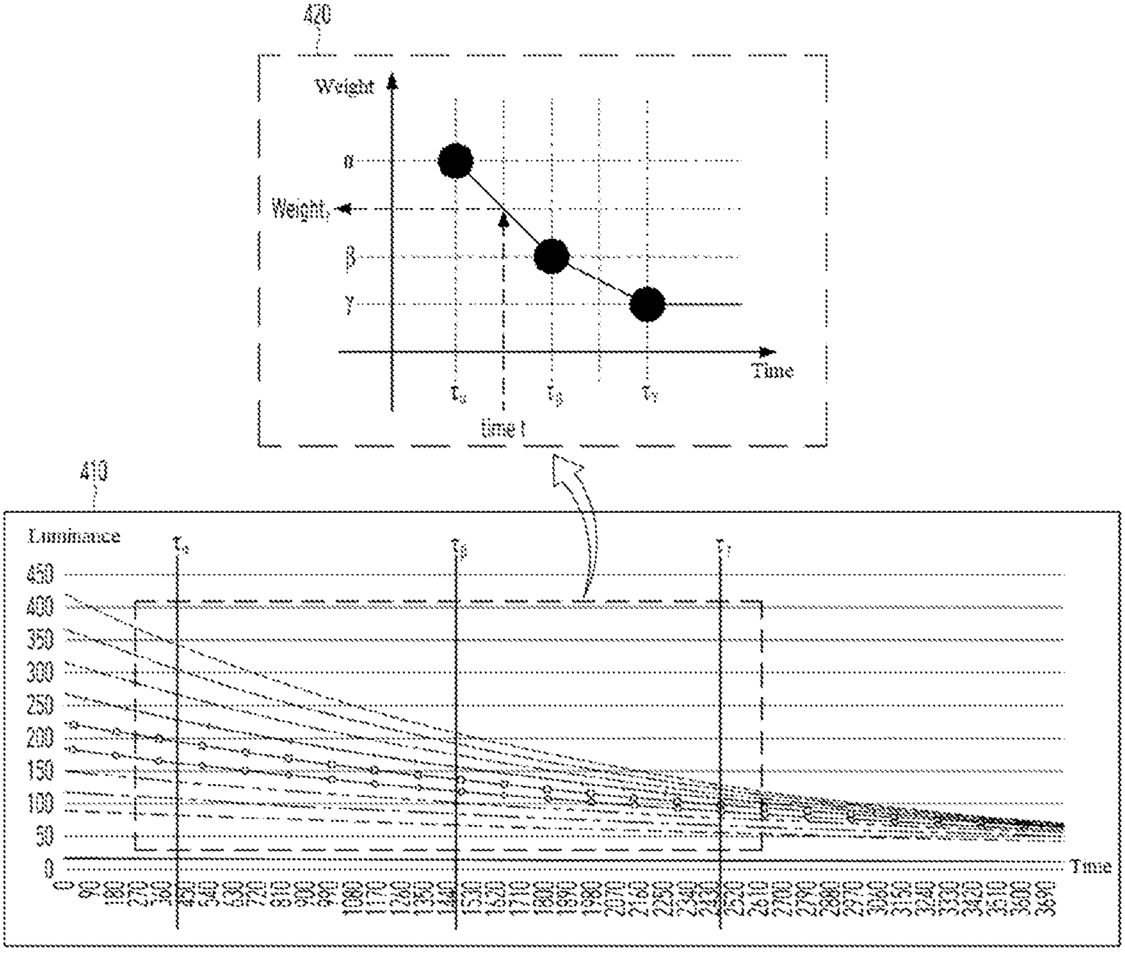

【FIG. 5】
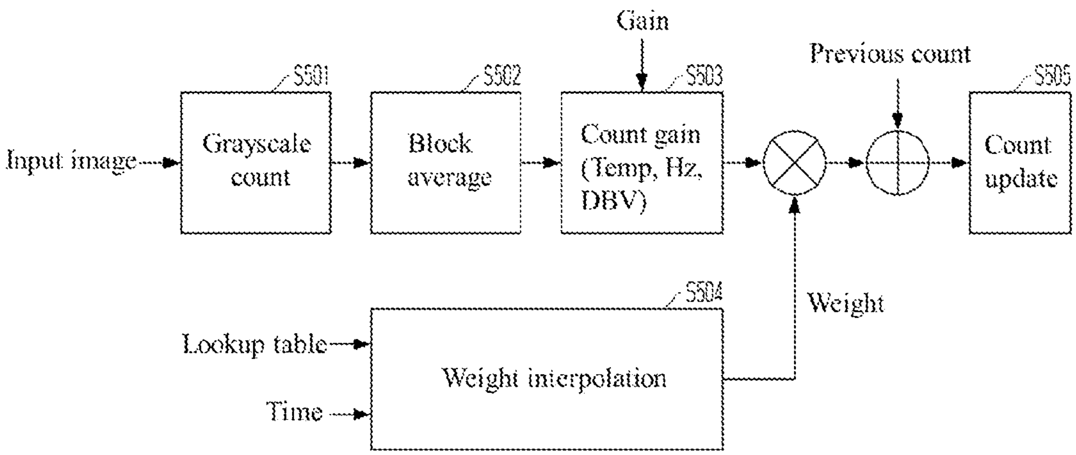

【FIG. 6】
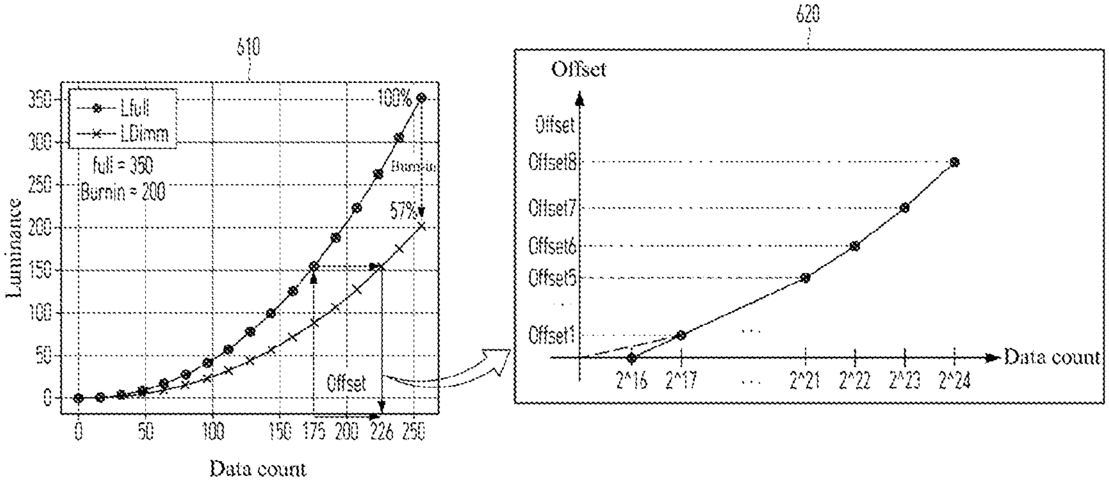

【FIG. 7】
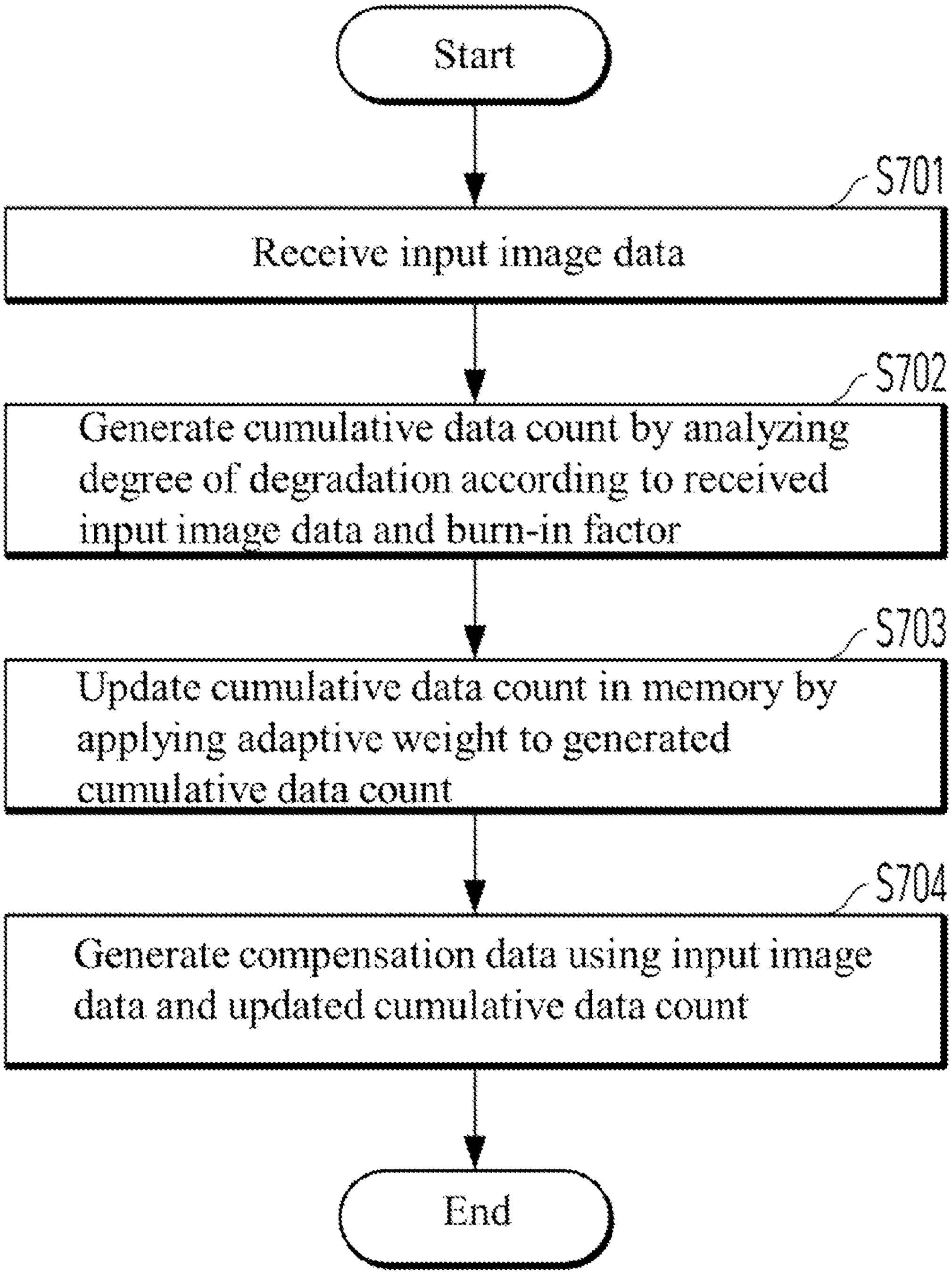

DISPLAY APPARATUS AND CONTROL METHOD THEREOF

CROSS-REFERENCE TO RELATED APPLICATIONS

This application claims the priority benefit of Korean Patent Application Nos. 10-2022-0173351 filed on Dec. 13, 2022 and 10-2023-0155386 filed on Nov. 10, 2023, all of which are hereby incorporated by reference in their entirety as if fully set forth herein.

TECHNICAL FIELD

Embodiments of the present disclosure relate to a display apparatus and a control method thereof. Examples of the display apparatus include a liquid crystal display (LCD), an organic light-emitting diode (OLED) display, a mini-light-emitting diode (mini-LED) display, a micro-light-emitting diode (micro-LED) display, and a quantum dot light-emitting diode (QLED) display, and in principle, the present disclosure is not limited to any specific device. Furthermore, the display apparatus mentioned herein may be, for example, a finished product itself (e.g., a TV, digital signage, a cellular phone, a car navigation system, etc.) or a component that controls a display module (e.g., a driver IC, a timing controller (T-CON), etc.).

BACKGROUND

Recently, while various display apparatuses have been proposed, a burn-in phenomenon is still a problem.

For example, if the same screen has been displayed on a display apparatus or if an image of a broadcaster with a fixed position for each channel has been continuously exposed to a screen, color of that part is not expressed properly or an afterimage (stain) remains on the screen, which is called burn-in.

The burn-in phenomenon described above may be problematic in various display apparatuses and will now be explained using an OLED as an example.

The reason why afterimages occur in an OLED display apparatus is that constituent materials of the OLED display apparatus are organic materials. The OLED, which is vulnerable to light and heat, decreases in brightness and color reproduction as use time increases.

In particular, if a specific color is displayed statically for a long time, the lifespan of pixels used decreases, and in this case, the screen begins to appear smudged. As a result, this stain leads to a burn-in phenomenon that permanently leaves an afterimage on the screen.

To solve this burn-in phenomenon, according to the prior art, the OLED display apparatus has analyzed burn-in factors according to a data-counting method to accumulate the degree of degradation as a count value and has corrected a luminance deviation using a compensation value based on the accumulated count value.

However, according to the above-described prior art, when the count value reaches a cumulative limit value, the luminance deviation is continuously corrected using the same compensation value, so there is a problem in that accurate compensation is not possible after a certain time.

SUMMARY

Accordingly, the present disclosure has been made in an effort to solve the above-described problems, and an object of the present disclosure is to provide a technique of increasing a cumulative lifespan by applying a different weight to a cumulative data count in order to increase time to reach a cumulative limit value by improving a data cumulative method for compensating for degradation of an OLED element.

The objects to be achieved by the present disclosure are not limited to what has been particularly described hereinabove and other objects not described herein will be more clearly understood by persons skilled in the art from the following detailed description.

To achieve these objects and other advantages and in accordance with the purpose of the disclosure, as embodied and broadly described herein, a display apparatus includes a receiver configured to receive input image data, an accumulator configured to generate a cumulative data count by analyzing a degree of degradation according to the received input image data and a burn-in factor, an interpolator configured to update the cumulative data count in a memory by applying an adaptive weight to the generated cumulative data count, and a compensator configured to generate compensation data using the input image data and the updated cumulative data count.

The interpolator may generate the adaptive weight by performing a first interpolation operation using information about luminance that degrades over time.

The interpolator may calculate the adaptive weight to be applied according to time through the first interpolation operation based on a first lookup table storing weights to be applied according to preset representative times as representative values.

The interpolator may perform a cumulative data count update based on at least one of a previous data count stored in the memory, the generated cumulative data count, or the generated adaptive weight.

The interpolator may analyze a grayscale count of the input image data, calculate a block average of the analyzed grayscale count, and generates count gain by analyzing gain input to the calculated block average.

The interpolator may generate the count gain based on the burn-in factor including at least one of temperature, frequency, a display brightness value, or a grayscale.

The interpolator may assign a reduced weight to an accumulated count value as time continues through the cumulative data count update.

The compensator may generate an offset value by performing a second interpolation operation using the information about luminance that degrades over time. The compensator may calculate an offset value to be applied according to the cumulative data count through the second interpolation operation based on a second lookup table storing offset values to be applied according to preset cumulative data counts.

The compensator may generate the compensation data by applying the offset value calculated according to the second interpolation operation to the input image data.

In another aspect of the present disclosure, a control method of a display apparatus includes receiving input image data, generating a cumulative data count by analyzing a degree of degradation according to the received input image data and a burn-in factor, updating the cumulative data count in a memory by applying an adaptive weight to the generated cumulative data count, and generating compensation data using the input image data and the updated cumulative data count.

Implementing, by third parties, a computer-readable medium (e.g., an application, a memory, software, etc.)

recording a program for performing any one of the above-described methods and various embodiments described in this specification also falls within the scope of the present disclosure.

According to any one of embodiments of the present disclosure, a cumulative lifespan increases by applying a different weight to a cumulative data count in order to increase time to reach a cumulative limit value by improving a data cumulative method for compensating for degradation of an element.

The effects that are achievable by the present disclosure are not limited to what has been particularly described hereinabove and other advantages not described herein will be more clearly understood by persons skilled in the art from the following description.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a diagram illustrating the configuration of a display apparatus according to an embodiment of the present disclosure;

FIG. 2 is a block diagram illustrating elements of a display apparatus according to an embodiment of the present disclosure;

FIG. 3 illustrates a degradation compensation process of a display apparatus according to an embodiment of the present disclosure;

FIG. 4 exemplarily illustrates a graph for explaining a degradation model applied to an adaptive data cumulative method of a display apparatus according to an embodiment of the present disclosure;

FIG. 5 is a flowchart illustrating an adaptive data cumulative method of a display apparatus according to an embodiment of the present disclosure;

FIG. 6 exemplarily illustrates a graph for explaining an offset interpolation method according to an embodiment of the present disclosure; and FIG. 7 is a flowchart illustrating a control method of a display apparatus according to an embodiment of the present disclosure.

DETAILED DESCRIPTION

Throughout the specification, the same reference numerals denote substantially the same elements. In the following description, when a function and a configuration known to those skilled in the art are irrelevant to the essential configuration of the present disclosure, detailed description thereof may be omitted. The terms described herein should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by the scope of the claims.

Like reference numerals refer to like elements throughout the specification. In the following description, when the detailed description of the relevant known function or configuration is determined to unnecessarily obscure the subject matter of the present disclosure, the detailed description will be omitted.

When "comprise", "have", and "include" described in the present specification are used, another part may be added unless "only" is used. When an element is described in a singular form, the element may exist in plural unless the context clearly indicates otherwise.

In describing a temporal relationship, for example, when a temporal order is described as "after", "subsequent to", "next", and "before", a non-sequential order may also be included unless "immediately" or "directly" is used.

It will be understood that, although the terms "first", "second", etc. may be used herein to describe various elements, these elements should not be limited by these terms. These terms are only used to distinguish one element from another. Therefore, a first element mentioned hereinbelow could be termed a second element without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically. The embodiments of the present disclosure may be carried out independently from each other or may be carried out together in co-dependent relationship.

FIG. 1 is a diagram illustrating a configuration of a display apparatus according to one embodiment of the present disclosure.

As shown in FIG. 1, a display apparatus 100 according to one embodiment of the present disclosure includes a display panel 110, a display driver 120, a data driver 140, and a gate driver 150. However, some modules may be added, removed, or changed according to the needs of those skilled in the art.

The display panel 110 includes a plurality of gate lines GL1-GLn and a plurality of data lines DL1-DLm that are arranged crosswise to each other to define a plurality of pixel regions, and pixels P provided in each of the plurality of pixel regions.

The plurality of gate lines GL1-GLn may be arranged in a horizontal direction and the plurality of data lines DL1-DLm may be arranged in a vertical direction. However, embodiments are not necessarily limited thereto.

In one embodiment, the display panel 110 may be a liquid crystal display (LCD) panel. When the display panel 110 is an LCD panel, the display panel 110 includes thin-film transistors (TFTs) formed in the pixel regions P defined by the plurality of gate lines GL1-GLn and the plurality of data lines DL1-DLm, and liquid crystal cells connected to the TFTs.

Of course, the present disclosure is applicable not only to LCDs, but also to micro LEDs, mini LEDs, OLEDs, and the like.

The TFTs supply data signals supplied through the data lines DL1-DLm to the liquid crystal cells in response to scan pulses supplied through the gate lines GL1-GLn.

The liquid crystal cell includes a common electrode and a sub-pixel electrode facing each other across the liquid crystal, the subpixel electrode being connected to a TFT. Thus, it may be equivalently represented as a liquid crystal capacitor Clc. Such a liquid crystal cell includes a storage capacitor Cst connected to the previous gate line to maintain the data signal charged in the liquid crystal capacitor Clc until the next data signal is charged.

A pixel region of the display panel 110 may include red (R), green (G), and blue (B) subpixels. In one embodiment, the subpixels may be repeatedly arranged in order of R, G, and B within one horizontal line. In this case, in two adjacent horizontal lines, two subpixels connected to the same data line may be configured as subpixels of different colors. To this end, the first horizontal line may set the last subpixel as a dummy pixel, and the second horizontal line adjacent to the first horizontal line may set the first subpixel as a dummy pixel, such that two subpixels of different colors in the first and second horizontal lines may be connected to the same data line.

While the display panel 110 has been described as an LCD panel in the above-described embodiment, the display panel 110 may be an organic light emitting diode (OLED) panel in which three-color subpixels are formed in each pixel region.

Also, while the display panel 110 has been described as having three-color subpixels in the embodiment described above, the display panel 110 may have red (R), green (G), blue (B), and white (W) subpixels in other embodiments.

The display driver 120 is configured to drive the display panel, and includes a timing controller 122 and an overdriving controller 124.

The timing controller 122 receives various timing signals, including a vertical synchronization signal Vsync, a horizontal synchronization signal Hsync, a data enable (DE) signal, and a clock signal CLK, from an external system (not shown) and generates a data control signal (DCS) to control the data driver 140 and a gate control signal (GCS) to control the gate driver 150.

In one embodiment, the DCS may include a source start pulse (SSP), a source sampling clock (SSC), and a source output enable signal, and the GCS may include a gate start pulse (GSP), a gate shift clock (GSC), and a gate output enable signal.

Here, the SSP controls the timing of the start of data sampling of one or more source driver integrated circuits (ICs) constituting the data driver 140. The SSC is a clock signal that controls the sampling timing of data in each of the source driver ICs. The source output enable signal controls the output timing of the data driver 140.

The GSP controls the timing of the start of operation of one or more gate driver ICs that constitute the gate driver 150. The GSC, which is a clock signal input to the one or more gate driver ICs in common, controls the shift timing of the scan signal (gate pulse). The gate output enable signal specifies the timing information about the one or more gate driver ICs.

Further, the timing controller 122 forwards image data Idata received from an external system (not shown) to the overdriving controller 124. The timing controller 122 receives pixel data (Idata) corresponding to the image data or overdrive pixel data Idata' from the overdriving controller 124, converts the same into a data signal processable by the data driver 140, and outputs the data signal to the data driver 140.

The overdriving controller 124 determines whether the current subpixel is overdriven by comparing the current subpixel with a previous subpixel on a per horizontal line basis in the image data. When the overdriving controller 124 determines that the current subpixel is overdriven, it generates overdriven pixel data about the current subpixel.

FIG. 2 is a block diagram illustrating elements of a display apparatus according to an embodiment of the present disclosure.

A display apparatus 100 according to an embodiment of the present disclosure includes a receiver 210, an accumulator 220, an interpolator 230, and a compensator 240. However, the scope of rights of the present disclosure should be determined according to the matters stated in the claims.

The receiver 210 functions as a buffer that stores received image data for a certain time. Although not illustrated in FIG. 2, the image data is received from an external or internal module of the display apparatus through an interface (not illustrated).

The accumulator 220 generates a cumulative data count by analyzing the degree of degradation according to the received input image data and burn-in factors.

For example, the burn-in factors are factors that affect the lifespan of an OLED depending on light-emitting characteristics and may include use time, and temperature, humidity, driving current, frequency, and a display brightness value during use.

The interpolator 230 updates the cumulative data count in a memory by applying an adaptive weight to the generated cumulative data count.

According to an embodiment, the interpolator 230 generates the adaptive weight using information about luminance that degrades over time and updates the cumulative data count based on the generated adaptive weight. This will be described later with reference to FIGS. 4 and 5.

The compensator 240 generates compensation data using input image data and the updated cumulative data count.

According to an embodiment, the compensator 240 may calculate an offset value to be applied according to the cumulative data count based on a lookup table, which will be described later with reference to FIG. 6.

FIG. 3 illustrates a degradation compensation process of a display apparatus according to an embodiment of the present disclosure.

Upon receiving input image data, the display apparatus 100 according to an embodiment of the present disclosure performs degradation analysis based on prestored burn-in factors (S301). The display apparatus 100 receives a gray-scale of the input image data and at least one burn-in factor among temperature, frequency, or a display brightness value (hereinafter referred to as DBV) and analyzes degradation information.

The display apparatus 100 generates cumulative data (S302) based on a result of degradation analysis (S301). The cumulative data is called a cumulative data count obtained by accumulating the degradation information in the form of a count.

In this case, the display apparatus 100 applies an adaptive weight to the cumulative data count in order to extend time to reach a cumulative limit value (S303).

The display apparatus 100 updates the cumulative data count to which the adaptive weight is applied in a count memory (e.g., a static random access memory (SRAM)) (S304).

The display apparatus 100 generates compensation data using the updated cumulative count and the input image data (S305). In this case, the generated compensation data is data obtained by adding an offset value for degradation compensation to the input image data.

FIG. 4 exemplarily illustrates a graph for explaining a degradation model applied to an adaptive data cumulative method of a display apparatus according to an embodiment of the present disclosure.

A data counting method to prevent burn-in of the display apparatus 100 described above accumulates the degree of degradation as a count value by analyzing input burn-in factors. The data counting method accumulates usage data converted from driving current delivered to each pixel or panel driving environments (e.g., temperature, a DBV, frequency, etc.). However, since the size of a memory used in the display apparatus 100 is limited, when the count value reaches a cumulative limit value, a luminance deviation is continuously corrected using the same compensation value, resulting in a problem that accurate compensation is not possible after a certain time.

On the other hand, according to an embodiment of the present disclosure, the adaptive data cumulative method uses a method of accumulating a cumulative data count by applying a different weight value to the cumulative data count in order to increase time to reach the cumulative limit value.

To this end, the adaptive data cumulative method is designed to adjust the cumulative limit value stored in the memory by applying a weight according to time using a degradation model.

Referring to FIG. 4, a degradation model 410 shows that degradation rapidly occurs at the beginning and luminance decreases significantly, and as time passes, the degree of decrease in luminance becomes smaller. In particular, in an X-axis direction, (+) means that a time value increases to the right, and in a Y-axis direction, (+) means that a luminance value increases upward.

Using this degradation model 410, time to reach the cumulative limit value stored in the memory may be extended by assigning a reduced weight to a cumulative count value as time continues.

The adaptive weight is calculated by performing a first interpolation operation as shown in Equation 1 below based on a first lookup table 420 that stores representative values corresponding to representative times based on the degradation model 410.

$$\text{Weight}_t = \beta + \frac{((\alpha - \beta) \times (t - \tau_\alpha))}{\tau_\beta - \tau_\alpha} \quad \text{[Equation 1]}$$

Here, t is current time, $\text{Weight}_t$ is a weight corresponding to the current time, a is a preset first representative value, β is a preset second representative value, $\tau_\alpha$ is time corresponding to the first representative value, and $\tau_\beta$ is time corresponding to the second representative value.

According to an embodiment, the weight ($\text{Weight}_t$) corresponding to the current time is calculated through the first interpolation operation as a value between the first representative value α and the second representative value β when the current time t is between the first time $\tau_\alpha$ and the second time $\tau_\beta$. In this case, the first lookup table 420 shows that the weight decreases significantly at the beginning, and as time passes, the degree of decrease in the weight becomes smaller. In particular, in an X-axis direction, (+) means that a time value increases to the right, and in a Y-axis direction, (+) means that a weight increases upward.

Then, count update is performed as shown in Equation 2 below using the weight calculated through the first interpolation operation.

$$\text{Count}_t = \text{Count}_{t-1} + \text{Weight}_t \times \text{Update}_t \quad \text{[Equation 2]}$$

Here, $\text{weight}_t$ is a weight corresponding to current time, $\text{Update}_t$ is an update constant, $\text{Count}_{t-1}$ is a cumulative count value before the update, and $\text{Count}_t$ is a cumulative count value after the update.

FIG. 5 is a flowchart illustrating an adaptive data cumulative method of a display apparatus according to an embodiment of the present disclosure.

As illustrated in FIG. 5, a data counting method for alleviating burn-in of the display apparatus 100 according to the present disclosure analyzes a grayscale count of input image data (S501).

The display apparatus 100 calculates a block average (S502) of the analyzed grayscale count (S501).

The display apparatus generates count gain (S503) by analyzing gain input to the calculated block average (S502). The count gain includes gain for each burn-in factor.

For example, if the burn-in factor is temperature (Temp), count gain for the temperature (Gaintemp) is generated; if the burn-in factor is frequency (Hz), count gain for the frequency (Gainhz) is generated; if the burn-in factor is a DBV, count gain for the DBV (GainDBV) is generated; and if the burn-in factor is a grayscale (Gray), count gain for the grayscale (Gaingray) is generated.

Meanwhile, the display apparatus 100 performs weight interpolation through a first interpolation operation based on a frame-count-based time and a lookup table that stores weights generated based on the degradation model 410 (S504).

The display apparatus 100 performs count update based on a weight according to a result of the first interpolation operation, the count gain, and a previous cumulative count value prestored in a memory (S505).

FIG. 6 exemplarily illustrates a graph for explaining an offset interpolation method according to an embodiment of the present disclosure.

Referring to FIG. 6, the display apparatus 100 according to an embodiment of the present disclosure generates compensation data 610 by changing luminance output to a display by adjustment of an offset. To this end, the display apparatus 100 adjusts output luminance by applying an offset value according to a cumulative count value in order to correct a degradation phenomenon. In particular, in the X-axis direction, (+) means that the cumulative count value increases to the right, and in the Y-axis direction, (+) means that the luminance value increases upward.

The offset value corresponding to the cumulative count value applied to degradation correction is stored in a second lookup table 620. In particular, in the X-axis direction, (+) means that the cumulative count value increases to the right, and in the Y-axis direction, (+) means that the offset value increases upward.

For example, the X axis means a driving time of a display panel and represents that the cumulative count value increases according to the degree of degradation according to the driving time. The Y axis means an offset value for correcting luminance of an input image and represents that the offset value to be applied increases according to the driving time.

In the lookup table of the present disclosure, representative offset values according to cumulative count values are set to eight offset values (offset1 to offset8), but the lookup table is not necessarily limited thereto.

The representative offset values stored in the lookup table may be calculated as shown in Equation 3 below based on the degradation model 410.

$$\text{Offset}_{r0} = \text{Gain}_{hz} \times \text{Gain}_{temp} \times \text{Gain}_{gray} \times \text{Gain}_{DBV} \times C20 \quad \text{[Equation 3]}$$

Here, $offset_{r0}$ is a representative offset value stored in the lookup table, $Gain_{temp}$ is count gain for temperature, $Gain_{hz}$ is count gain for frequency, $Gain_{gray}$ is count gain for a grayscale, and C20 is an offset value corresponding to a cumulative count value.

In this case, an offset value increases as the cumulative count value increases. As a degradation phenomenon progresses, the offset value increases, and when the cumulative count value reaches the limit, an offset value applied may also be the maximum.

Then, the display apparatus 100 calculates the offset value to be applied according to the cumulative count value through a second interpolation operation as shown in Equation 4 by using the representative offset values pre-stored in the second lookup table 620.

[Equation 4]

$$\text{Offset}(C2O) = \text{Weight}_n - \frac{((\text{Weight}_n - \text{Weight}_{n-1}) \times (DC_n - \text{count}_r))}{DC_n - DC_{n-1}}$$

Here, offset(C20) is an offset value corresponding to a cumulative count value, $weight_n$ is a weight corresponding to a current cumulative count value, and $weight_{n-1}$ is a weight corresponding to a cumulative count value before update.

Accordingly, the display apparatus 100 generates degradation-corrected compensation data by applying the offset value calculated according to the cumulative count value to input image data.

FIG. 7 is a flowchart illustrating a control method of a display apparatus according to an embodiment of the present disclosure.

Referring to FIG. 7, the display apparatus 100 receives input image data (S701) and generates a cumulative data count by analyzing the degree of degradation according to the received input image data and a burn-in factor (S702).

The display apparatus 100 updates the cumulative data count in a memory by applying an adaptive weight to the generated cumulative data count (S703). To this end, the display apparatus 100 generates the adaptive weight by performing a first interpolation operation using information about luminance that degrades over time and performs a cumulative data count update based on at least one of a previous data count stored in the memory, the generated cumulative data count, or the generated adaptive weight. The display apparatus 100 assigns a reduced weight to an accumulated count value as time continues through the cumulative data count update. The display apparatus 100 generates compensation data using the input image data and the updated cumulative data count. The display apparatus 100 performs a second interpolation operation to calculate an offset value to be applied according to the cumulative data count based on a lookup table storing a preset offset value and generates the compensation data by applying the offset value generated according to the second interpolation operation to the input image data (S704). In this case, the lookup table includes the first lookup table 420 applied to the first interpolation operation for generating the adaptive weight and the second lookup table 620 applied to the second interpolation operation for generating the compensation data.

Thus, the display apparatus 100 uses a method of accumulating a cumulative data count by applying a different weight value to the cumulative data count in order to increase time to reach the cumulative limit value, thereby enabling precise degradation compensation for a long time.

In addition, the display apparatus 100 increases the reliability of degradation compensation by extending an accurate compensation time through the adaptive weight, in order to prevent a problem of performing inaccurate compensation generated by correcting a luminance deviation with the same compensation value after a count value reaches a cumulative limit value in a memory of a limited size.

In addition, if a cumulative count value decreases according to an adaptive weight, since a compensation value to be applied according to the cumulative count data decreases, the display apparatus 100 prevents overcompensation and extends a compensation lifespan by alleviating stress applied to a device.

Through this, the display apparatus 100 applies a method of accumulating by applying different weights to the cumulative data count in order to increase the time to reach the accumulation limit value, thereby extending the time to reach the accumulation limit value, enabling precise degradation compensation for a long period of time.

To prevent the problem of performing inaccurate compensation by correcting a luminance deviation using the same compensation value after reaching a cumulative limit value in a memory of a limited size, the display apparatus 100 extends an accurate compensation time through an adaptive weight, thereby increasing the reliability of degradation compensation.

In addition, when an accumulated count value decreases according to the adaptive weight, since a compensation value to be applied according to the cumulative count value decreases, the display apparatus 100 prevents overcompensation and reduces the stress applied to the device, thereby extending a compensation lifespan.

Those skilled in the art will appreciate that the present disclosure may be carried out in other specific ways than those set forth herein without departing from the spirit and essential characteristics of the present disclosure.

The methods described in the present specification may be implemented at least partially using one or more computer programs or components. These components may be provided as a series of computer instructions on a computer-readable medium or a machine-readable medium, including a volatile or non-volatile memory. The instructions may be provided as software or firmware, and/or may be implemented in whole or in part in hardware components such as application specific integrated circuits (ASICs), field programmable gate arrays (FPGAs), digital signal processors (DSPs), or any other similar devices. The instructions may be configured to be executed by one or more processors or other hardware components, which, when executing the series of computer instructions, perform or make it possible to perform all or some of the methods and procedures disclosed herein.

The foregoing present specification is not limited to the foregoing embodiments and the accompanying drawings. It will be apparent to those skilled in the art that various replacements, modifications, and changes may be made without departing from the general technical knowledge of the present specification. Therefore, the scope of the disclosure is characterized by the detailed description of the following claims, and all changes and modifications derived from the meaning, range, and equivalent concept of claims should be construed as being included in the present disclosure.

What is claimed is:

1. A display apparatus, comprising:

a receiver configured to receive input image data;

an accumulator configured to generate a cumulative data count by analyzing a degree of degradation according to the received input image data and a burn-in factor;

an interpolator configured to update the cumulative data count in a memory by applying an adaptive weight to the generated cumulative data count; and a compensator configured to generate compensation data using the input image data and the updated cumulative data count, wherein, in the update of the cumulative data count, the interpolator is configured to assign a reduced weight to an accumulated count value as time continues.

2. The display apparatus of claim 1, wherein the interpolator is configured to generate the adaptive weight by performing a first interpolation operation using information about luminance that degrades over time.

3. The display apparatus of claim 2, wherein the interpolator is configured to calculate the adaptive weight to be applied according to time through the first interpolation operation based on a first lookup table storing weights to be applied according to preset representative times as representative values.

4. The display apparatus of claim 2, wherein the interpolator is configured to perform a cumulative data count update based on at least one of a previous data count stored in the memory, the generated cumulative data count, or the generated adaptive weight.

5. The display apparatus of claim 4, wherein the interpolator is configured to analyze a grayscale count of the input image data, calculate a block average of the analyzed grayscale count, and generate a count gain by analyzing a gain input to the calculated block average.

6. The display apparatus of claim 5, wherein the interpolator is configured to generate the count gain based on the burn-in factor including at least one of temperature, frequency, a display brightness value, or a grayscale.

7. The display apparatus of claim 2, wherein the compensator is configured to generate an offset value by performing a second interpolation operation using the information about luminance that degrades over time.

8. The display apparatus of claim 7, wherein the compensator is configured to calculate an offset value to be applied according to the cumulative data count through the second interpolation operation based on a second lookup table storing offset values to be applied according to preset cumulative data counts.

9. The display apparatus of claim 8, wherein the compensator is configured to generate the compensation data by applying the offset value calculated according to the second interpolation operation to the input image data.

10. A control method of a display apparatus, comprising:

receiving input image data;

generating a cumulative data count by analyzing a degree of degradation according to the received input image data and a burn-in factor;

updating the cumulative data count in a memory by applying an adaptive weight to the generated cumulative data count; and generating compensation data using the input image data and the updated cumulative data count, wherein, in the update of the cumulative data count, a reduced weight is assigned to an accumulated count value as time continues.

11. The control method of the display apparatus of claim 10, wherein the updating the cumulative data count comprises generating the adaptive weight by performing a first interpolation operation using information about luminance that degrades over time.

12. The control method of the display apparatus of claim 11, wherein the generating the adaptive weight comprises calculating the adaptive weight to be applied according to time through the first interpolation operation based on a first lookup table storing weights to be applied according to preset representative times as representative values.

13. The control method of the display apparatus of claim 11, wherein the updating the cumulative data count comprises performing a cumulative data count update based on at least one of a previous data count stored in the memory, the generated cumulative data count, or the generated adaptive weight.

14. The control method of the display apparatus of claim 13, wherein the updating the cumulative data count comprises:

analyzing a grayscale count of the input image data;

calculating a block average of the analyzed grayscale count; and generating a count gain by analyzing a gain input to the calculated block average.

15. The control method of the display apparatus of claim 14, wherein the generating the count gain comprises generating the count gain based on the burn-in factor including at least one of temperature, frequency, a display brightness value, or a grayscale.

16. The control method of the display apparatus of claim 11, wherein the generating the compensation data comprises generating an offset value by performing a second interpolation operation using the information about luminance that degrades over time.

17. The control method of the display apparatus of claim 16, wherein the generating the offset value comprises calculating an offset value to be applied according to the cumulative data count through the second interpolation operation based on a second lookup table storing offset values to be applied according to preset cumulative data counts.

18. The control method of the display apparatus of claim 17, wherein the generating the compensation data comprises generating the compensation data by applying the offset value calculated according to the second interpolation operation to the input image data.

* * * * *